(No Model.) 9 Sheets—Sheet 1.

J. T. AVERY.
LASTING MACHINE.

No. 472,599. Patented Apr. 12, 1892.

Fig. 1.

Witnesses:
Inventor:
John T. Avery by
Paul Bakewell
his attorney (No Model.) 9 Sheets—Sheet 3.

J. T. AVERY.
LASTING MACHINE.

No. 472,599. Patented Apr. 12, 1892.

Fig. 3.

Witnesses.

Inventor.

(No Model.)

J. T. AVERY.
LASTING MACHINE.

No. 472,599.

Patented Apr. 12, 1892.

Witnesses.

Inventor:
John T. Avery, by
Paul Bakewell
his attorney.

(No Model.) 9 Sheets—Sheet 7.

J. T. AVERY.
LASTING MACHINE.

No. 472,599. Patented Apr. 12, 1892.

Witnesses.

Inventor:
John T. Avery by
Paul Bakewell
his attorney (No Model.)　　　　　　　J. T. AVERY.　　　　9 Sheets—Sheet 8.
LASTING MACHINE.

No. 472,599.　　　　　　　　　　　Patented Apr. 12, 1892.

Witnesses.　　　　　　　　　　　　Inventor:

(No Model.)　　　　　　　　　　　　9 Sheets—Sheet 9.

J. T. AVERY.
LASTING MACHINE.

No. 472,599.　　　　　　　　Patented Apr. 12, 1892.

UNITED STATES PATENT OFFICE.

JOHN T. AVERY, OF ST. LOUIS, MISSOURI, ASSIGNOR TO THE AVERY LASTING MACHINE COMPANY, OF SAME PLACE.

LASTING-MACHINE.

SPECIFICATION forming part of Letters Patent No. 472,599, dated April 12, 1892.

Application filed May 11, 1891. Serial No. 392,406. (No model.)

*To all whom it may concern:*

Be it known that I, JOHN T. AVERY, a citizen of the United States, residing in the city of St. Louis and State of Missouri, have invented certain new and useful Improvements in Lasting-Machines, of which the following is a full, clear, and exact description.

My invention relates to shoe-lasting machinery by which the upper is automatically secured to the insole after it has been fitted and roughly secured to the last, the whole being held to the machine, in the manner hereinafter specified, by the operator. More particularly it relates to improvements in the lasting-machine for which United States Letters Patent No. 387,926 were granted to Charles Sinning and myself on August 14, 1888, and has for its object to make the said machine more efficient in practical operation, to simplify the machine as a whole, dispensing with parts, and in place thereof substituting other parts and movements, reducing to a minimum the operative parts and movements necessary to effectively perform the work required of the machine.

My invention consists, among other things, in the several features of improvements enumerated below; first, in mounting the pinchers and guide-rest on an independent head-stock, which is secured to the framing of the machine on slides and to which is given, as hereinafter described, a reciprocating movement to the right and left, effecting the feed of the machine; second, in specially-designed mechanism convenient for regulating the amount of sidewise movement of the sliding head-stock—*i. e.*, the feed—as has been found necessary in operating on different parts of the last; third, in mounting the pinchers in a secondary head-piece, which is secured to the independent sliding head-stock in such manner as to be capable of being given, by the mechanism hereinafter described, a forward and backward movement independent of said sliding head-stock; fourth, in a specially-formed guide-rest which is secured, along with the secondary head-piece which carries the pinchers, to the sliding head-stock, whereby the last when pressed against it in the operation of the machine is fed positively to the work and the leather of the upper held in position convenient to be taken hold of by the pinchers; fifth, in the addition of a retaining device and operating mechanism which in the operation of the machine will prevent any retrograde of the last in the feed of the machine; sixth, in an improved form of the gripping-jaws, whereby certain desirable results are accomplished; seventh, in improved mechanism for operating (raising and lowering and opening and closing) the gripping-jaws, whereby the several mechanical movements are accomplished at the right time through the instrumentality of one cam; eighth, in mechanism for regulating the height to which the grippers are raised; ninth, in an improved form of folder; tenth, in an improved form of tack-box; eleventh, in an improved form of pit in the tack-deliverer jaws. This description and the accompanying illustrations relate to these new features, the remaining parts of the machine in construction and operation being practically similar to what is set forth in the aforementioned patent, to which reference is herewith made.

In the accompanying drawings like numbers of reference denote like parts in the several figures.

Figure 1:
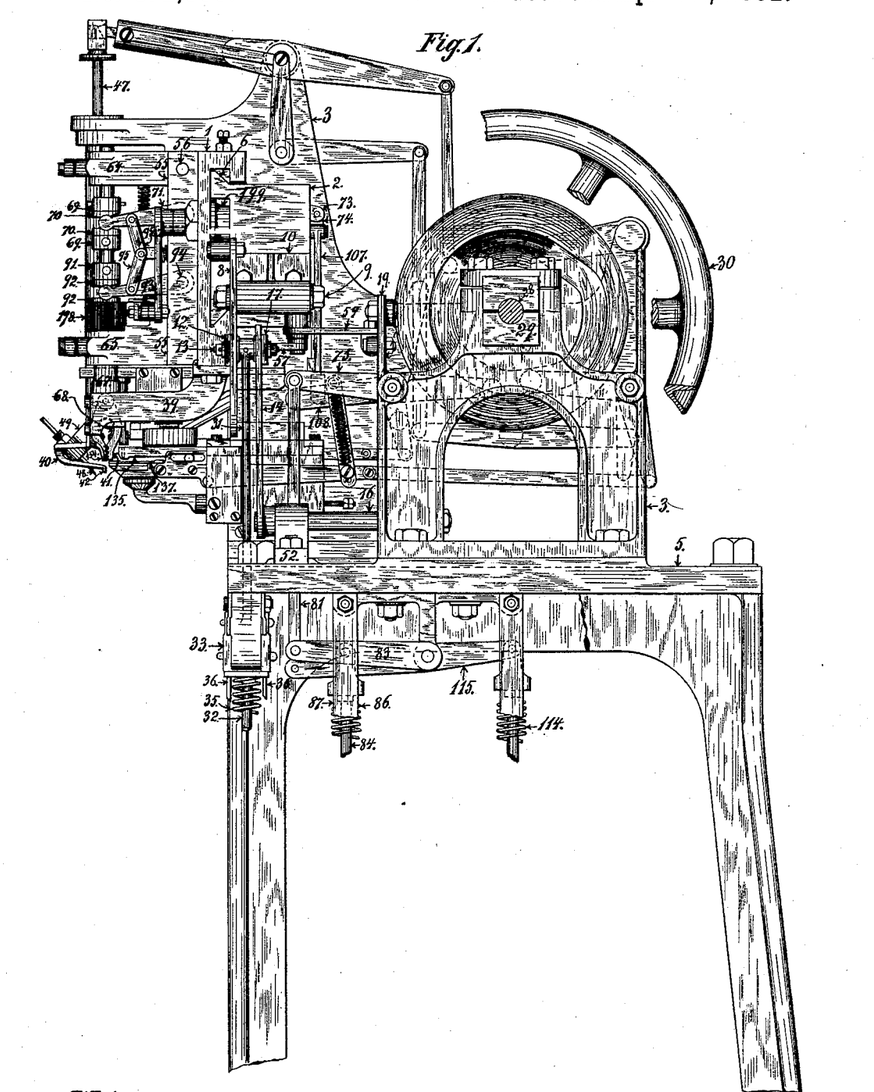
Figures 1 and 2 are respectively side and front elevational views of the top part of my improved lasting-machine.
Figure 2:
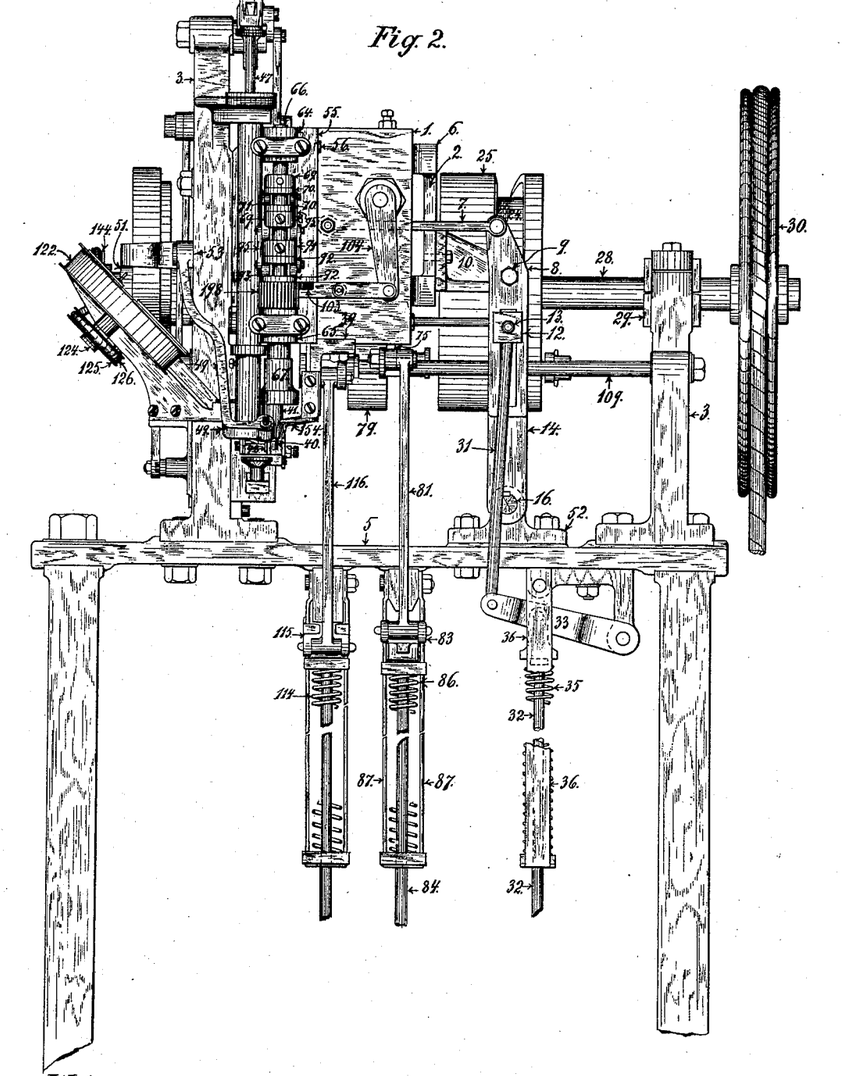
Figure 3:
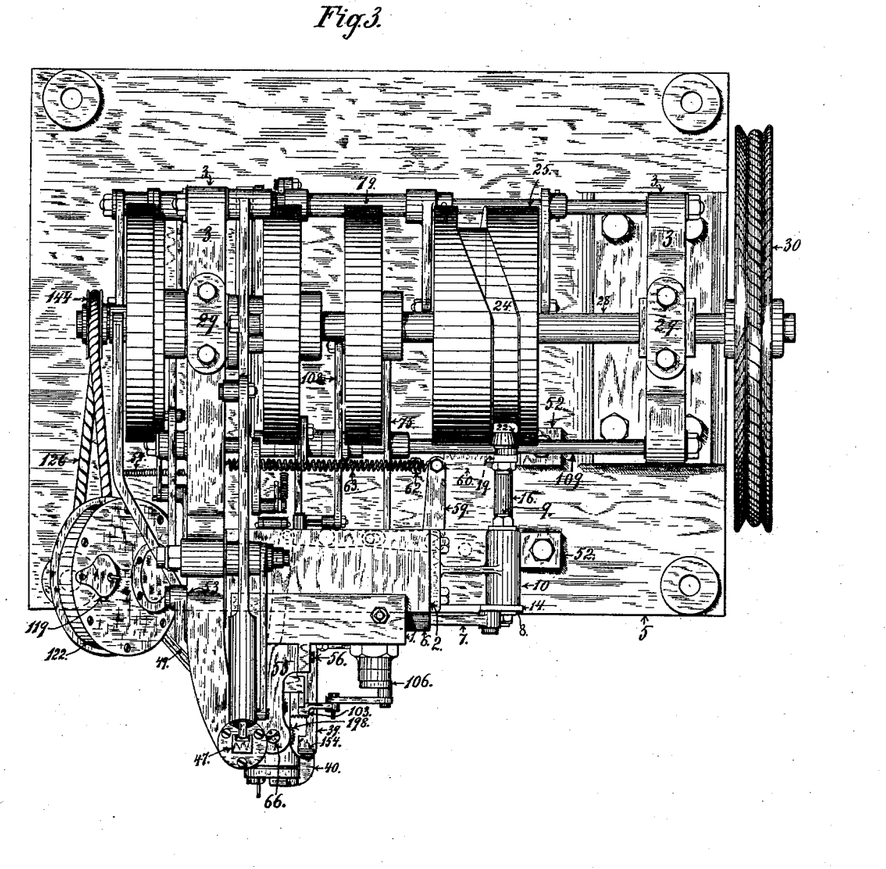
Fig. 3 is a plan view of the same.
Figure 6:
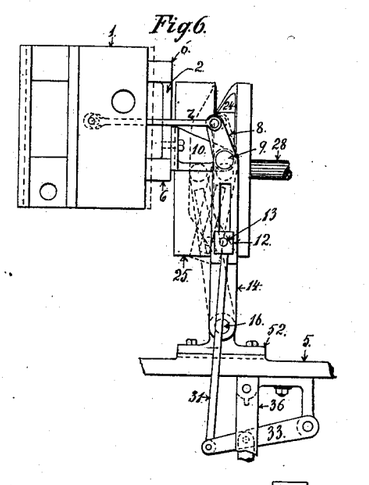
Figs. 6 and 7 are detailed views of the feed-regulating mechanism, showing, respectively, the relative position of the regulating device when making a minimum and maximum amount of feed, showing in dotted lines the extreme positions of the sliding head-stock in either case.
Figure 7:
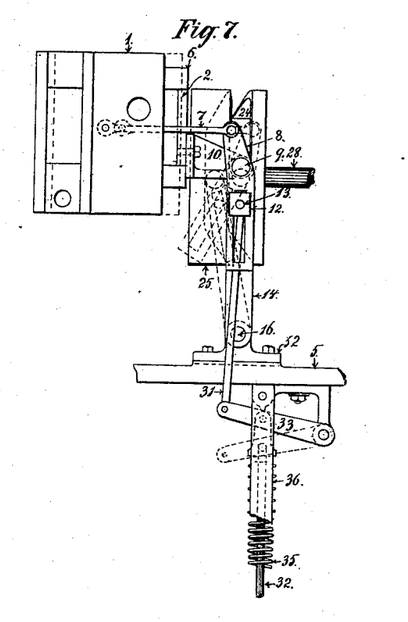

1 is a head-piece, which is secured to the laterally-projecting portion 2 of the framing 3 of the top portion of the machine, which is rigidly secured to the bed-plate 5 of the top part by the slides 6, (see Figs. 1, 2, and 3,) so that it is capable of a right-and-left reciprocating movement relative to the rest of the top part of the machine, as shown in dotted lines in Figs. 6 and 7. This movement is effected by connecting the sliding head-piece 1 by the connecting-rod 7 to one end of the lever 8. (See Figs. 1, 2, 3, 6, and 7.) The lever 8 is fulcrumed at 9 to the bracket-piece 10, which is rigidly secured to the framing 2. The free end of the lever 8 is slotted out to receive the sliding block 12, which is centrally perforated to receive one end of the connecting pivot-bolt 13. The other end of the bolt 13 is let into a sliding box 17, similar to 12, which is fitted to a slot formed in the free end of a pivoted arm 14. (See Figs. 1 and 9.) The arm 14 is rigidly secured on one end of the journaled shaft 16, which has bearings 52 52, secured to the bed-plate 5. To the other end of the shaft 16 (see Figs. 1, 3, and 9) is rigidly secured the crank-arm 19, which carries on its free end a laterally-projecting stud, which preferably carries the anti-friction roller 22, which is adapted to fit into and engage with the laterally-offset cam-groove 24, cut in the circumference of the cam-drum 25. The cam-drum 25 is mounted on the cam-shaft 28, which has journal-bearings at 29 29 (see Figs. 1, 2, and 3) in the supporting frame-work 3 and is given motion through the drive-wheel 30, mounted on one end of the same, as shown in Figs. 1, 2, and 3. The connecting pivot-bolt 13 is connected, through the intermediate connecting-rods 31 and 32 and the lever 33, (see Figs. 2, 6, and 7,) to the treadle-lever 34. (See Figs. 4 and 5.) The coil-spring 35, resting on the stirrup 36, which is secured to the under side of the bed-plate 5, tends to raise the foot-treadle 34 and with it the connecting pivot-bolt 13. The treadle 34 may be locked against such upward pull by allowing it to engage in one of the several notches 37, formed therefor in the base portion 38 of the framing of the machine. As will be seen from the drawings and description, the amount of movement of the pivoted arm 14 is fixed by the reciprocating movement of the crank-arm 19, and this by the predetermined lateral displacement of the cam-groove 24. The consequent amount of movement of the end of the lever 8, to which the connecting-rod 7 is connected, is dependent on the position of the pivot-bolt 13 relative to the center of the shaft 16, about which the arm 14 oscillates, and the fulcrum-bearing 9 of the lever 8, this being adjustable, as described, by the foot-treadle 34. The two extreme positions of the connecting pivot-bolt 13 are shown in Figs. 6 and 7, as well as the consequently different amount of movement (shown in dotted lines) of the sliding head-piece 1.

Figure 8:
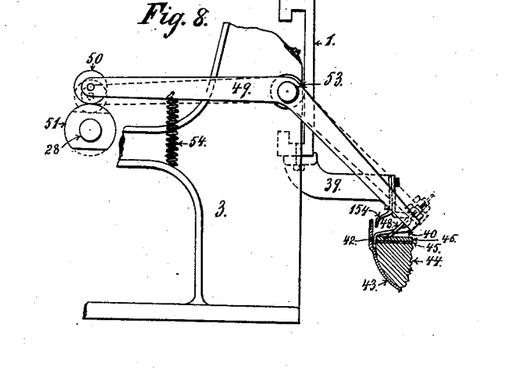
Fig. 8 is a side elevational view of the retaining device and its operating-cam.

To the sliding head-piece 1 is rigidly secured a bracket-piece 39, (see Figs. 1, 2, 3, and 8,) which carries on its end the guide-rest 40 in a position in line and just forward in the feed of the machine of the position of the pinchers 41. (See Figs. 1 and 2.) The guide-rest is so formed that it acts as a guide and rest for the operator to hold the last 44 against and prevent the last being raised when being operated on by the pinchers 41, as hereinafter described, and so that its downwardly-projecting finger end 42, (see Figs. 1 and 8,) which is designed to project in under the upper 43 (see Fig. 8) between it and the edge of the last 44 or the edge of the metal shield 45 and the insole 46 and act as a guide to keep the work in line, shall be operative at a point in close proximity to where the work of the pinchers 41 and the tack-driver 47 is being done. The guide-rest 40 has, therefore, a reciprocating movement to the right and left corresponding in the operation of the machine to the movement of the sliding head-piece 1. When the last 44, with attached leather, is held firmly up against it, (aided, as hereinafter described, by the pinchers,) the last will tend to follow the same. The backward movement of the work, however, is prevented by the end of the pointed retaining-finger 48, projecting into the leather of the insole 46, as shown in Fig. 8. This finger 48 has no lateral movement, being adjustably secured to the free end of the lever-bar 49, (see Figs. 1, 2, 3, and 8,) which is fulcrumed to the framing 3 at 53 and carries on its other end a roller 50, which engages with and is operated by the flat sided cam 51, mounted on the cam-shaft 28. The flat portion of the cam 51 in the revolution of the same permits the retaining-finger 48 to be raised away from the insole 46, as shown in dotted lines in Fig. 8, by the spring 54, one end of which is secured to the back end of the lever 49 and the other end to the framing 3. The cam 51 is so placed on the shaft 28 relative to the position of the offset in the cam-groove 24, which operates the sliding head-piece 1, that the retaining-finger 48 is removed from the insole 46 at the time the head and with it the guide-rest 40 and last 44 is moved forward. At all other times it is in position to prevent any movement of the work to the right or left.

Secured to the end of the bracket-piece 39, along with the guide-rest 40, is the downwardly-projecting finger-piece 154, which is designed to raise the edge of the leather of the upper 42 in the work to a position convenient to be taken hold of by the pinchers 41, as hereinafter described. It may be found in practice of advantage to form the guide-rest 40 as a closed loop, forming one side to correspond to the outline of the finger-piece 154 and perform its office, thereby strengthening the guide-rest 40.

Figure 9:
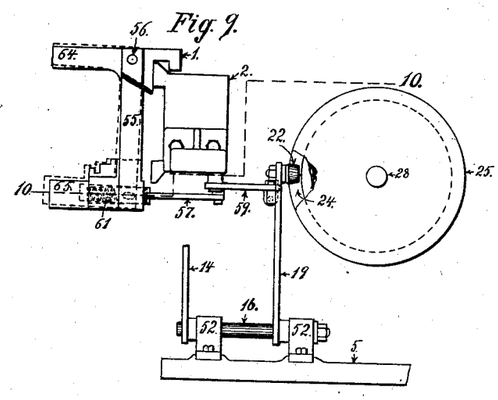
Fig. 9 is a side elevational view showing the action of the secondary head-piece carrying the pinchers and the mechanism for operating the same in its forward and backward movement.
Figure 10:
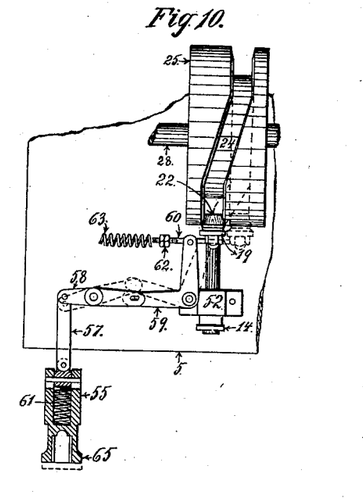
Fig. 10 is a view, part in section and part in plan, taken as on the line 10 10 in Fig. 9.
Figure 11:
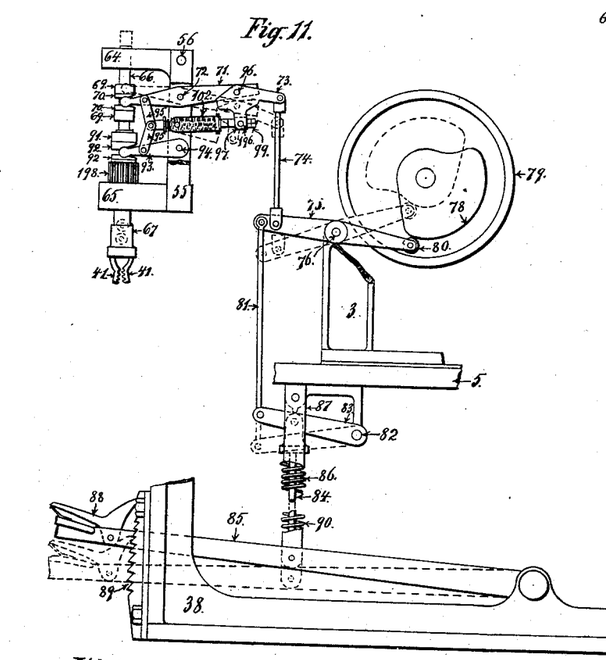
Fig. 11 is a side elevation, showing the mechanism for raising and lowering the grippers and for opening and closing the gripper-jaws and the mechanism for regulating the amount of such movement.
Figures 12, 13, 14, 15, 16:
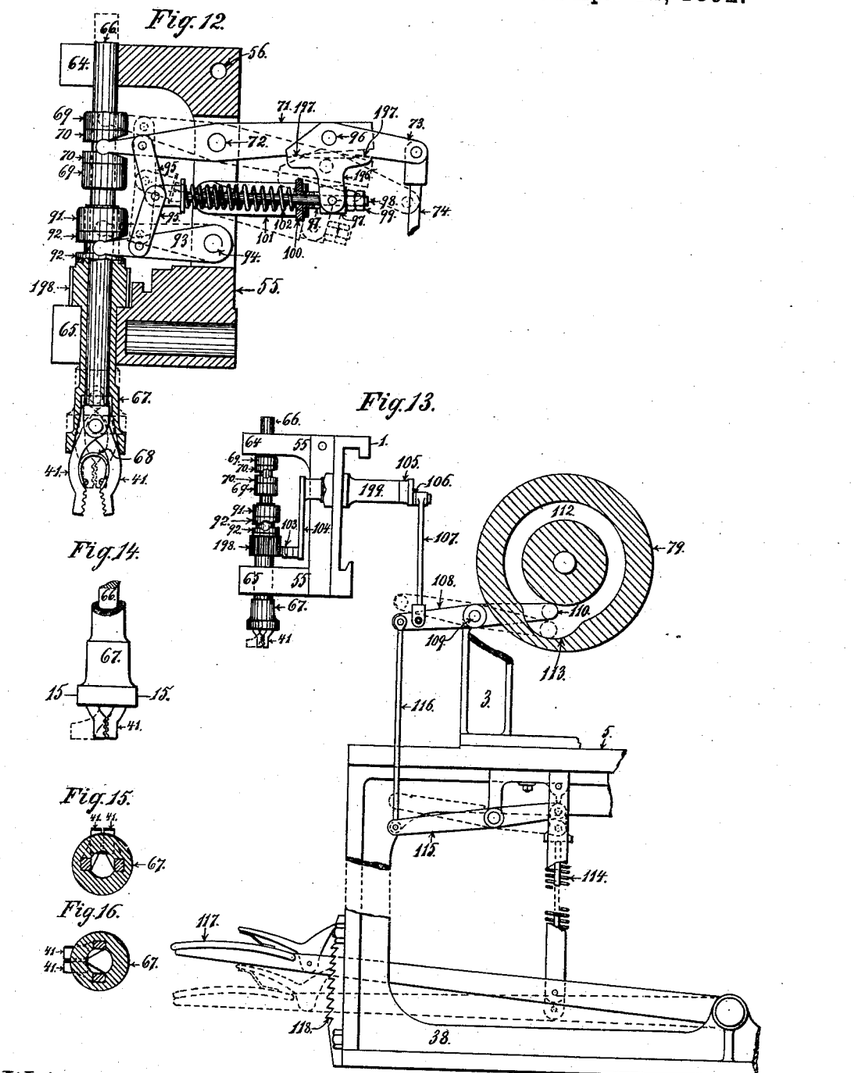
Fig. 12 is an enlarged detail view, as in Fig. 11, of the device for opening and closing the gripper-jaws as operated by the raising and lowering of the grippers as a whole.
Fig. 13 is a side elevation of the device for giving the twisting movement to the grippers and the foot-treadle regulation of the amount of such twisting movement.
Fig. 14 is an enlarged detail view showing in dotted lines the relative position in a side view of the gripper-jaws when twisted to their fullest extent.
Figs. 15 and 16 are sectional views taken on the line 15 15 in Fig. 14, showing, respectively, in plan view the positions of the gripper-jaws shown in Figs. 13 and 14.

I secure the pinchers 41 in my improved machine to a secondary head-piece 55, which is secured to the sliding head-piece 1 between the guides by a pivot-bolt 56 in such manner that the lower portion may be given a forward movement relative to the head-piece 1 about the pivot-bolt 56 as a center, as shown in Fig. 9. This movement of the head-piece 55 is effected by being mechanically connected through the intermediate bar 57, pivoted lever 58, bell-crank lever 59, and connecting-rod 60 to the crank-arm 19, already described. (See Figs. 9 and 10 and Figs. 6 and 7.) The forward movement of the bar 57, as derived from the operative mechanism described, is not transmitted positively to the head-piece 55, but is done through the interposed compression-spring 61, which permits of a certain amount of forward movement of the pusher-bar 57 without moving the head-piece 55, except as against the tension of the compressed spring 61. It will be seen then that the resultant forward pull of the pinchers, as hereinafter described, is dependent on the strength of the spring 61, and it may be found of advantage in practice to have replaceable springs of different strengths to correspond to the different grades of leather used in the uppers. As will be seen from an inspection of Fig. 10, the connecting-rod 60 is not connected to the end of the bell-crank lever 59 by a fixed connection, but that the rod 60 is passed through an eye secured to the end of the bell-crank lever 59, and that the movement of the rod 60 is communicated to the bell-crank lever 59 only when the nuts 62 abut against the end of the bell-crank lever 59 in the right-hand movement of the crank-arm 19 and the rod 60, connected thereto, as operated by the cam-groove 24 in the rotation of the cam-drum 25, as shown in dotted lines in Fig. 10. The position of the abutting-nuts 62 being adjustable, the positive amount of forward throw of the head-piece 55 (disregarding the interposed compression-spring 61) relative to the operative lateral displacement of the cam-groove 24 is adjustable. The backward movement to the position shown in full lines in Fig. 9 is caused by the contraction of the spiral spring 63, one end of which is fastened to the end of the bell-crank lever 59 and the other end to the framing 3 of the machine. This spring 63 is shown fully in Fig. 3, it being broken away in Fig. 10 to show the nuts 62. The operative effect of this forward movement of the head-piece 55 will appear quite fully in the description of the operation of the pinchers 41, bearings for which are found in the forwardly-projecting portions 64 65 of the head-piece 55, as seen in Figs. 1, 2, 11, 12, and 13. The gripping jaws or pinchers 41 are pivotally secured to the lower end of the gripper-shaft 66, which extends up through the sleeve 67 and has a bearing in the upper projection 64 of the head-piece 55, as shown in Fig. 12. The jaws 41 are forced apart by the bent spring-piece 68 placed between them and the ends of which are secured to either one of the jaws 41, respectively. The jaws are closed, so as to grip any leather between them, by the shaft 66, and with it the attached jaws 41, being drawn upwardly within the sleeve 67, as hereinafter described and as shown in dotted lines in Fig. 12, the wedge-shaped outside surfaces of the jaws 41 coming in contact with the inside wall of the sleeve 67 and being pressed together in the comparatively confined space therein. This upward movement of the gripper-shaft 66 relative to the sleeve 67, whereby the closing of the jaws is effected, will be explained more fully hereinafter.

Figure 4:
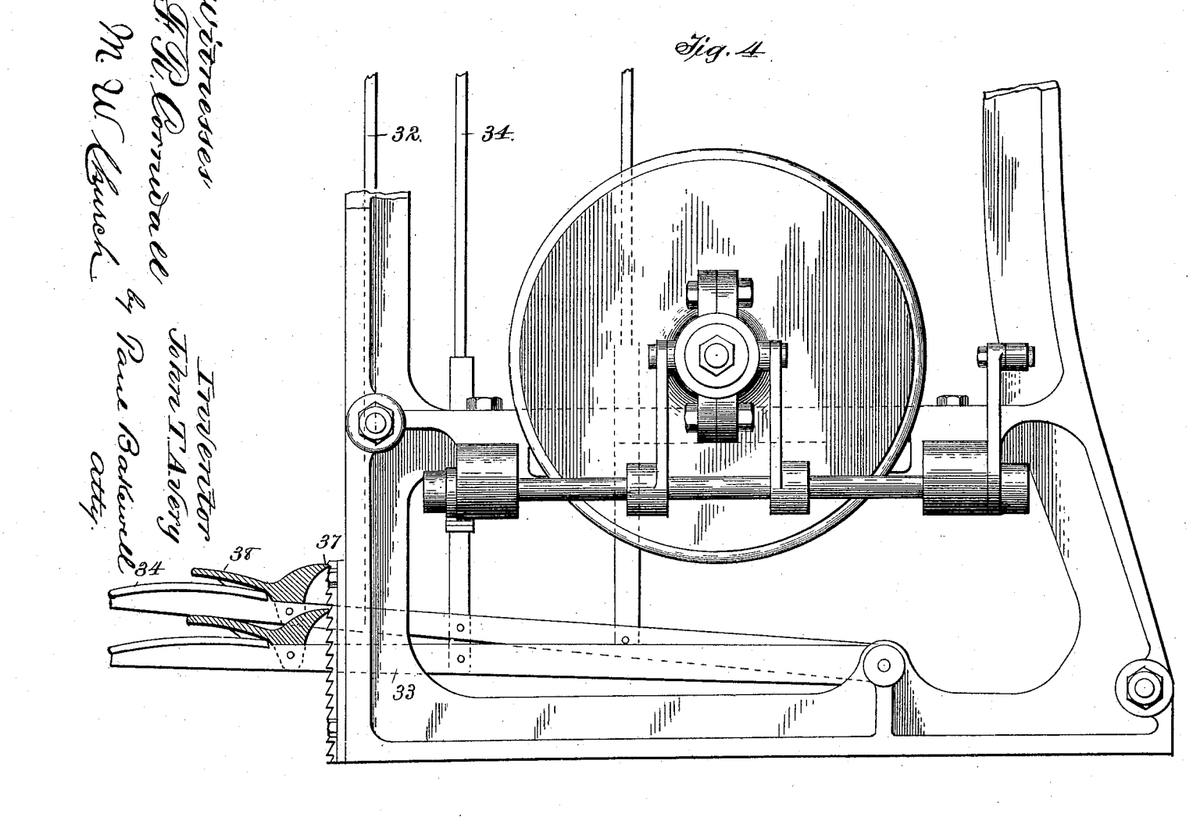
Figs. 4 and 5 are respectively side and front elevational views of the base portion of my machine.
Figure 5:
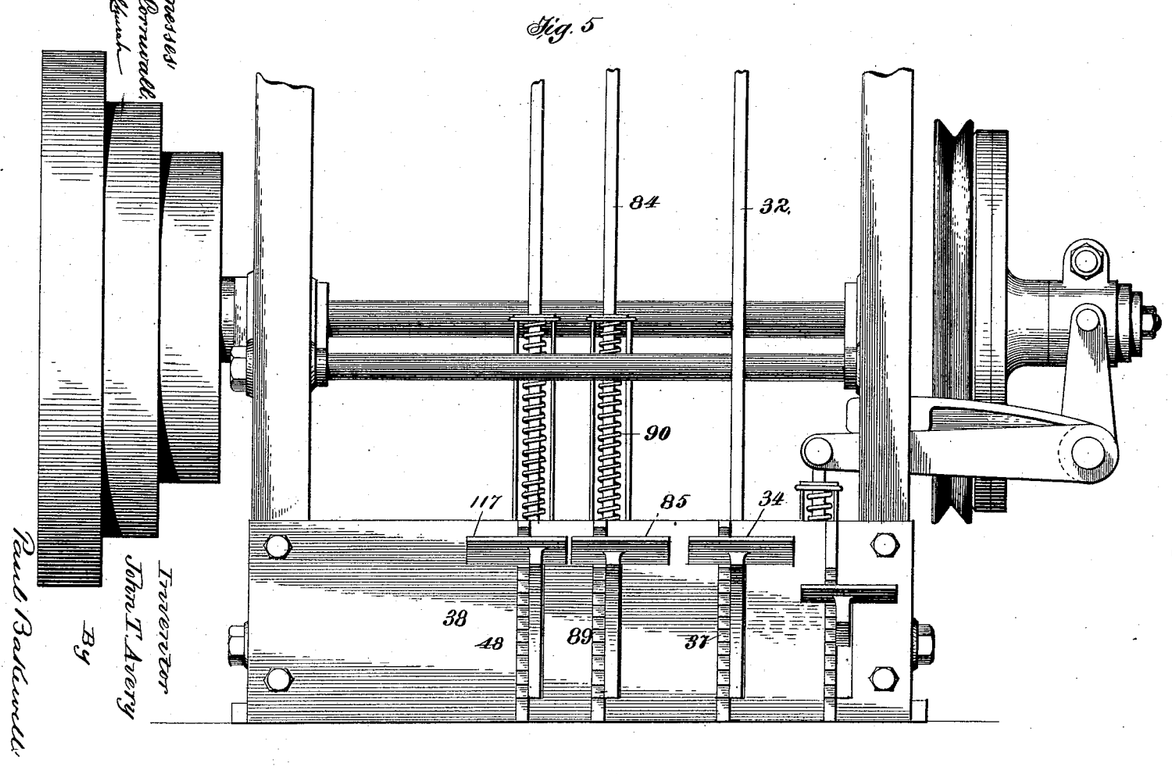

The raising of the grippers as a whole—that is, with the sleeve 67—is effected in the following manner: To the shaft 66 are rigidly secured the flat collars 69, which embrace and act as stops longitudinally for the revoluble collar 70. To the collar 70 is pivotally secured one end of the lever 71, which has a fulcrum-bearing secured to the head-piece 55 at 72. On its free end the lever 71 carries a second short lever 73, pivotally connected thereto at 96, which acts, as far as the raising of the pinchers is concerned, as an extension of the lever-bar 71, as shown in Fig. 11. To the projecting end of the short lever 73 is secured by a double-pivot connection, in order to allow for the sidewise movement of the head-piece 1, one end of the connecting-rod 74, the other end of which is similarly secured to one end of the pivoted lever 75, which has a fulcrum-bearing at 76, secured to framing 3. The other or free end of the lever 75 carries an anti-friction roller 80 on a laterally-projecting stud secured thereto, which engages with the cam 78, cut in the right-hand side of the cam-drum 79. (See Fig. 3.) To the front end of the lever 75 is connected one end of the connecting-rod 81, the other end of which is connected to the free end of the lever 83, which has a fulcrum-bearing at 82, secured to the under side of the bed-plate 5. To approximately the middle portion of the pivoted lever 83 is pivotally connected the upper end of the treadle-rod 84, which connects the lever 83 with the foot-treadle 85. (See Figs. 4, 5, and 11.) The upper end of the rod 84 rests on the upper end of a coil-spring 86, the lower end of which is supported in a stirrup 87, which is secured to the bed-plate 5. (See Fig. 2.) This spring 86 tends to raise the treadle-rod 84, and with it the different parts of the gripper-raising device connected therewith, to its normal position, that shown in full lines in Fig. 11, (see also Fig. 2,) against the downward pull of the treadle 85, when depressed to the position shown in dotted lines in Fig. 11 and locked by permitting the foot-pawl 88 to rest in one of the several ratchet-notches 89, formed in the base 38 of the machine. The treadle-rod 84 is not connected directly to the treadle 85, there being an interposed spiral spring 90, through which the downward pull of the treadle 85 is transmitted to the treadle-rod 84. (See Fig. 5.)

The operation of the gripper-raising device is as follows: It is evident from an inspection of Fig. 11 that the depression of the short lever 73, and with it the back end of the lever 71, will raise the pinchers as a whole. By depressing the foot-treadle 85 the lever 73 will be carried downward, except when the radially-enlarged portion of the cam 78 is in a position to prevent the back end of the lever 75 from rising. In that case the interposed spring 86 will be compressed and be ready to act and raise the treadle-rod 84 and connected parts to their normal position (shown in full lines in Fig. 11) as soon as the cam-drum 79 has been rotated in the operation of the machine sufficiently to bring the comparatively radially-reduced portion of the cam 78 opposite the roller 80 on the end of the lever 75, permitting it to approach the center of the cam-drum, thereby allowing the spring 86 to depress the back end of the lever 71. The height to which the pinchers are raised within the radial limits of the cam 78 is dependent on the amount of depression given to the treadle 85.

To the upper end of the sleeve 67 is rigidly secured a collar 91. Between the collar 91 and a shoulder formed by diametrically reducing the upper portion of the sleeve 67 is revolubly secured the collar 92, similar to the collar 70 on the gripper-shaft 66, already described. To this collar 92 is pivotally connected one end of the lever 93, the other end of which has a pivot-bearing 94, secured to the head-piece 55.

The forward end of the shaft-raising lever 71 and the sleeve-raising lever 93 are connected by the jointed connecting-bar 95, forming a toggle-joint between the two levers, whereby they may be separated or brought toward each other, thereby raising or lowering the shaft 66 within the sleeve 67 relative thereto, effecting the opening or closing of the gripper-jaws, as already explained. The short lever 73 is formed with a laterally-projecting arm 196, in the end of which is secured the pivoted block 97. One end of the toggle-rod 98 is connected with the joint of the toggle-levers 95 and the other end loosely fitted in a perforation in the block 97. On the end of the rod 98, beyond the block 97, are secured the check-nuts 99. Around the rod 98, between the block 97 and the forward end of the rod, is loosely fitted the flanged collar-piece 100, the reduced portion of which extends through a perforation formed in the loop of the stirrup 101, so as to be in a position to be acted upon by the block 97. The stirrup 101 is pivotally connected at its open end to the head-piece 55. The forward push of the block 91, as against the collar 100, as hereinafter described, is transmitted to the rod 98 through the interposed spring 102, the back end of which rests against the collar 100 and the forward end against the comparatively enlarged head portion of the rod 98. The tension of the spring 102 tends to straighten toggle-joint lever-bars 95; but this tension is adjusted so that it is not strong enough to raise the shaft 66 relative to the sleeve 67 as long as the flange-collar 100 rests in the bottom of the stirrup 101, or until the collar 100 is pushed forward by the block 97. It will be seen from an inspection of Fig. 12 that the closing and opening of the gripper-jaws 41 is effected by the rotary movement of the short lever 73 about the pivot-bearing 96 relative to the lever 71. The amount of this rotary movement of the lever 73 is determined by stops 197, formed in the same, abutting up against the under side of the lever 71 in the operation of raising and lowering the pinchers as a whole. The backward movement of the block 97, abutting against the nuts 99, makes the opening of the jaws 41 positive in the relative movement of the lever 73, as in depressing the pinchers as a whole. The object of effecting the forward movement of the toggle-rod 98 through the compression of the interposed spring 102 is that in some instances, as when the grippers have included a fold of leather thicker than usual, the jaws will be closed to a degree only sufficient (dependent, of course, on the predetermined strength of the spring 102) to firmly grasp the leather, not necessarily closing the jaws to the extent that would be consequent if the toggle-joint were connected positively to the lever-arm 196. The object of raising the pinchers as a whole, as well as giving them the forward movement already described and as shown in Figs. 9 and 10, which is done when the pinchers are in their raised position, is to properly stretch the leather of the upper over the edge of the last.

Besides the stretching of the upper it is necessary at some parts of the work (as in rounding the toe) to crimp the leather preparatory to its being tacked, and this is done by causing the grippers 41 to be turned about the center of the shaft 66 with the sleeve 67. For this purpose the sleeve 67 is formed with a spur-gear 198 near its upper end, which is in engagement with a rack which is fitted in slides in the head 55, and is operated by being pivotally connected with the end of the crank-arm 104, (see Figs. 2 and 13,) secured to one end of the crank-shaft 105, journaled in a sleeve 199, secured to the head-piece 1. The crank-shaft 105 has secured to its other end a crank-arm 106 at right angles to the crank-arm 104, so that when the end of arm 106 is raised or lowered, as hereinafter described, the end of the arm 104 will be moved to the right or left, respectively, revolving the sleeve 67 and with it the grippers 41. The free end of the arm 106 is pivotally connected by a ball-and-socket joint, or other similar connection, to make provision for the sidewise movement of the head-piece to one end of the connecting-rod 107, the other end of which is similarly connected with one end of the pivoted lever 108, which has a fulcrum-bearing on the lever-shaft 109, secured to the framing 3, and carries on its other end a laterally-projecting stud and anti-friction roller 110. This roller 110 on the end of the lever 108 is in a position to engage with the cam-groove 112, cut in the left-hand side of the cam-drum 79. (See Figs. 3 and 13.) The main portion of the cam-groove 112 is nothing more than an annular groove of a width to accommodate the roller 110. At one point of the groove 112 it is recessed, forming a radially enlarged groove, as at 113, into which in the revolution of the cam-drum 79 the roller 110 may be forced, thereby giving a twist to the pinchers 41, through the intermediate mechanism already described. The normal position of the roller, that shown in full lines in Fig. 13, is against the central hub portion of the cam-drum and there is no tendency in the operation of the machine for the roller 110 to enter the recess 113, unless impelled to do so by the tension of the spring 114, (see Fig. 2,) through the intermediate lever 115 and connecting-rod 116, (see Fig. 13,) when compressed by the foot-treadle 117, being depressed and secured in one of the several notches 118, formed in the framing 38 of the base of the machine. The connection between the treadle-lever 117 and the spring 114 is practically similar to that between the treadle-lever 85 and the spring 86, already described. As will be seen, the amount of movement within the radial limits of the recess 113 and the consequent amount of throw of the rack 103, giving the twisting motion to the sleeve 67, is dependent on the amount of depression given to the treadle-lever 117. The extreme amount of such twisting of the pinchers is approximately one-quarter of a turn, as indicated in Figs. 13 and 14 and in the cross-sections, Figs. 15 and 16. As shown in Figs. 13 and 14, the operative part of the pincher-jaws 41— the part by which the leather is taken hold of—is thrown to one side of the center of the shaft 66, about which they revolve when twisted, as described. The object is this: that all the leather included in the bite of the jaws 41 will be given a more or less forward or tightening pull, as shown in the change of position of the jaws 41 in the sectional views, Figs. 15 and 16, respectively, and no part of the leather a backward or slackening movement, as would be the case if the operative part of the jaw was equally disposed on either side of the center of revolution.

Figures 18, 19, 20, 21, 22, 23, 24, 25, 26, 27, 28, 29, 30, 31, 32:
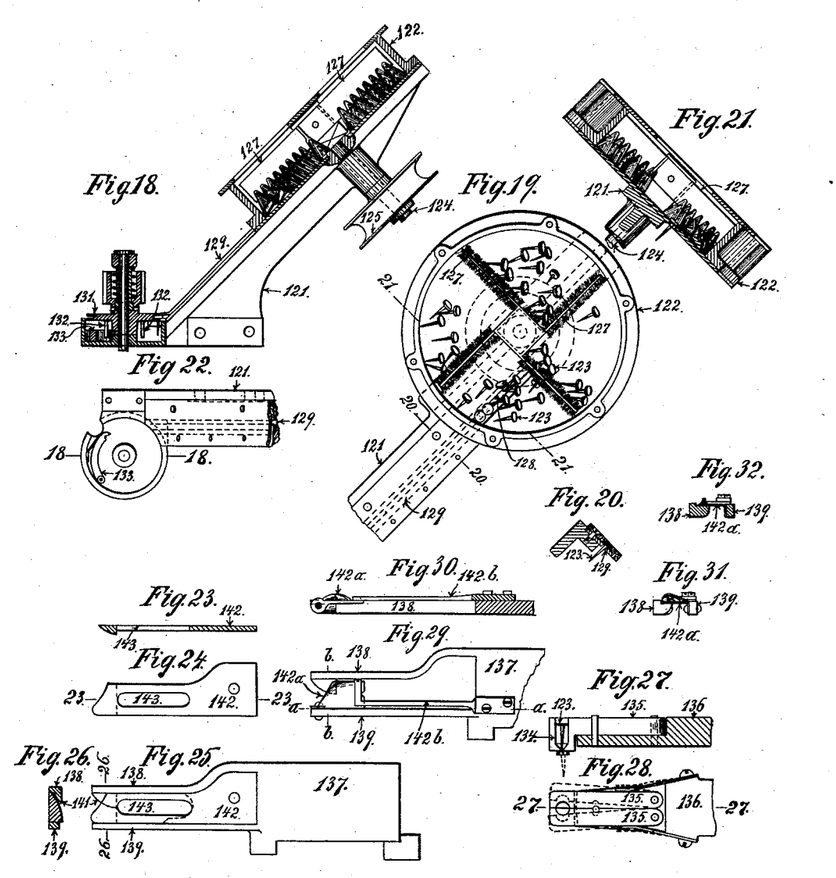
Fig. 18 is a side elevational view, partly in section, as on the line 18 18 in Fig. 22, of the tack box, race, and delivering disk.
Fig. 19 is a plan view of the tack-box with the cover removed.
Fig. 20 is a section of the tack-race, taken on the line 20 20 in Fig. 19.
Fig. 21 is a sectional view of the tack-box, taken on the line 21 21 in Fig. 19.
Fig. 22 is a plan view of the interior of the tack-delivering disk-box, showing the pawl for engaging the revoluble disk to prevent its backward rotation in the backward movement of the tack-box supporting-frame.
Fig. 23 is a longitudinal section of the spring-lip of the folder, taken as on the line 23 23 in Fig. 24.
Fig. 24 is a plan view of the spring-lip of the folder.
Fig. 25 is a plan view of the end of the folder as a whole.
Fig. 26 is a section taken on the line 26 26 in Fig. 25.
Fig. 28 is a plan view of the end of the reciprocating bar that delivers the tack to the tack-hammer.
Fig. 27 is a section taken as on the line 27 27 in Fig. 28.
Figs. 29, 30, 31, and 32 are views of a somewhat different form of folder than that illustrated in Figs. 23, 24, and 25, being, respectively, a plan view, a longitudinal section taken as on the line $a\,a$ in Fig. 29, a front end view, and a cross-section taken on the line $b\,b$ in Fig. 29.

My improved tack-box, as illustrated in Figs. 18, 19, and 21, is constructed as follows: The box 122 itself is a circular closed box, in the lid of which is an opening (the lid 119 of which is shown in Fig. 3) for inserting the tacks 123 and is secured to a frame 121, to which is mechanically given in the operation of the machine the several movements practically similar and in the same manner as shown and described in the patent already referred to. Through a central perforation in the bottom of the box is fitted the stem 124, to the projecting end of which is secured the grooved pulley 125, which is connected, as shown in Figs. 2 and 3, to a small grooved pulley 144, secured on the shaft 28 by the elastic belt 126. To the end of the stem 124, inside the box 122, are secured the several (preferably four, as shown) radial arms 127. To the arms 127 are secured bunches of wire, which act as brushes, sweeping over the bottom of the box 122 when revolved in the operation of the machine by the belt 126. In the bottom of the box 122 is formed a slot 128, approximately one-half the diameter, corresponding, preferably, to a chord of the circular bottom. This groove is a continuation of the race 129, leading from the tack-box 122 to the revoluble tack-delivering disk 131, which, in the forward movement of the tack-box frame 121, is given a positive motion of rotation in one direction, as in the old machine, but which is in the backward movement of the frame 121 prevented from any retrograde rotation by the depending pins 132, secured to the disk 131, engaging with the spring-pawl 133, secured to the frame 121 beneath the disk 131. The arms 127, with the attached brushes revolving constantly, as they do while the machine is running, will sweep the tacks 123 over the slot until eventually some of the tacks are in a position for their points to drop down into the slot 128, when the motion of the supporting-frame 121 will tend to shake them down the inclined race 129 until they rest against another undelivered tack. To prevent the brushes from disturbing the tacks already in the slot, the bottom of the box is formed with an incline and an abrupt shoulder just forward of the slot 128, the heads of the tacks when in the slot resting just behind the shoulder and the brushes riding over them from the incline. This is shown in Fig. 21.

In my improved machine I have formed the tack-pit 134 in the separable jaws 135 of the tack-delivering bar 136, (see Figs. 27 and 28,) cylindrical, of a diameter corresponding to the size of the head of the tack 123, with the bottom slightly conical to center the point of the tack, as shown in Fig. 27. The advantage of this form of pit over the old conical form is that the vertical wall of the pit acts as a guide for the tack when it is being driven into the leather until it is almost completely driven, steadying and directing the tack, so as to keep it perpendicular—a result not attained by the old form.

My improved form of folder 137 is illustrated in Figs. 23, 24, 25, and 26. The piece 137, which is secured to the folder-bar, is formed with two projecting end portions 138 139, somewhat separated. One of these, the left-hand one 138, (facing the machine,) is formed with a laterally-projecting lip 141, which extends approximately one-half across the space between the two projecting end portions or fingers 138 139. The space between the fingers 138 139 is occupied by the flat spring-piece 142, overlapping the transversely-projecting lip-piece 141, which is secured at the back end to the piece 137, and is formed with a longitudinal slot 143, through which the tack is driven into the leather. The folder (illustrated in Figs. 29, 30, 31, and 32) is similar in essential features of construction and operation to that just described. The spring-piece 142 is replaced by the corresponding transversely-projecting overlapping-piece 142$^a$, which is pivotally secured at its forward end to the forward end of the projecting end portion 139, adapting it to be raised in the operation of the machine by the leather of the upper when it is bunched at its back end. The overlapping-piece 142$^a$ is normally pressed down by the flat spring 142$^b$, which is rigidly secured to the piece 137. The folder as a whole is secured, as in the machine the subject of the patent already referred to, to a bar to which is given a sliding backward and forward movement practically similar to that therein shown and described, except that with the present form of folder a more extended forward movement subsequent to the driving of the tack is necessary for the folder to clear itself, and its office is the same. The forward edges of the spring 142 and piece 142$^a$ and of the lip 141 are beveled transversely relative to the folder as a whole, forming the V-shaped opening between them.

Figure 33:
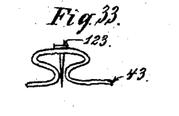
Figs. 33 and 34 are comparative illustrations of folds as made with a straight pushing folder, as heretofore used and as made with my improved turn-over folder, also showing the consequent advantage in the placing of the tack in such folds for retaining the same.
Figure 34:
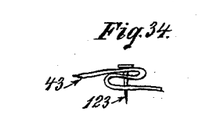

In the operation of the machine the office of the folder is to fold down the leather of the upper after it has been stretched by the pinchers, as already described, and lay it flat preparatory to its being tacked down. The peculiar advantages of this form of folder are these: that when the leather of the upper is creased, as around the toe, instead of laying the leather in bunched folds, as illustrated in Fig. 33, it will make overlapping folds of the same corresponding to the hem formed by a hemmer, as illustrated in Fig. 34, enabling the tack to be driven into the fold, so as to effectually secure the several layers of the leather. (See the position of the tack 123 relative to the leather in the fold, as shown in Figs. 33 and 34, respectively.)

I claim—

1. In a lasting-machine, the combination, with an independent laterally-movable head-stock carrying the gripping-jaws, of a guide-rest for the last rigidly secured to the head-stock, and means, substantially as described, for moving said head-stock laterally.

2. In a lasting-machine, the combination, with the frame, of guideways thereon, a head-stock slidingly mounted on said ways, means for actuating said head-stock, a guide-rest for the last secured to said head-stock and moving therewith, and lasting mechanism, substantially as and for the purposes described.

3. In a lasting-machine, the combination, with the frame, of guideways thereon, a head-stock slidingly mounted thereon and arranged to move laterally, a cam, suitable intermediate connections between said cam and head-stock for moving said head-stock laterally, and lasting mechanism, substantially as and for the purposes described.

4. In a lasting-machine, the combination, with a cam, of a rock-arm engaging therewith, a horizontal shaft on which said rock-arm is mounted, a slotted arm on the opposite end of the horizontal shaft, a pivoted bar provided with a slot in its lower member, a link on its upper member, a laterally-movable head-piece to which said link is attached, a movable pivoted pin passing through the slots in the lower member of the pivoted bar and rock-arm, and lasting mechanism, substantially as and for the purposes specified.

5. In a lasting-machine, the combination, with the laterally-movable head-stock, link, and pivoted bar provided with a slot in its lower member, of a horizontally-journaled rock-shaft, rock-arms on said shaft which are provided with a slot and roller, respectively, a cam with which the roller on one of the rock-arms engages, a pivot-pin passing through the slots of the rock-arm and pivoted arm, means for adjusting said pivot-pin, and lasting mechanism, substantially as and for the purposes specified.

6. In a lasting-machine, the combination, with the frame, of guideways thereon, a head-stock slidingly mounted on said guideways, means for reciprocating the head-stock laterally, suitable connections for adjustably limiting the throw of said head-stock, and lasting mechanism, substantially as and for the purposes described.

7. In a lasting-machine, the combination, with the frame, of guideways thereon, a laterally-movable head-stock slidingly-arranged on said ways, an independently-movable gripper-carrier mounted on the head-stock, and lasting mechanism, substantially as and for the purposes described.

8. In a lasting-machine, the combination, with the frame, of guideways thereon, a laterally-movable head-stock mounted on the ways, an independent movable gripper-carrier mounted on the head-stock, and vertically-reciprocating gripper-jaws mounted in the gripper-carrier, substantially as and for the purposes described.

9. In a lasting-machine, the combination, with the frame, of guideways thereon, a laterally-movable head-stock mounted on said ways, a gripper-carrier mounted on the head-stock, vertically-reciprocating gripper-jaws mounted in the gripper-carrier, and means for actuating the said parts independently of each other, substantially as and for the purposes described.

10. In a lasting-machine, the combination, with the frame, of guideways thereon, a laterally-movable head-stock mounted on said ways, means for limiting the throw of said head-stock, a gripper-carrier pivotally mounted on the head-stock and arranged to move backward and forward, a rotatable and vertically-reciprocating gripper-shaft mounted in the carrier, and suitable means for actuating the said parts, substantially as and for the purposes described.

11. In a lasting-machine, the combination, with the frame, of guideways thereon, a laterally-movable head-stock on said ways, a guide-rest for the last secured to said head-stock, a gripper-carrier and gripping-jaws pivotally secured to said head-stock, a retaining-finger fixedly mounted on the frame, and means for actuating said parts independently, substantially as and for the purposes described.

12. In a lasting-machine, the combination of a gripper-carrier, a shaft provided with gripping-jaws mounted therein, a collar on said shaft, a sleeve loosely mounted on said shaft, said sleeve being provided with a collar, pivoted levers engaging the collars and adapted to raise and lower the shaft and sleeve, a toggle-joint connection between said levers adapted to separate the same, and means for raising the levers simultaneously, substantially as and for the purposes specified.

13. In a lasting-machine, the combination, with the gripper-carrier and its gripper-shaft, of a sleeve on said shaft, revoluble collars on said shaft and sleeve, pivoted levers engaging said revoluble collars, a toggle-joint connection between said levers, a second lever provided with a downward extension pivoted on one of the aforesaid levers, a block mounted in the downward extension, a rod secured to the toggle and passing through said block, a stirrup pivotally mounted in the gripper-carrier and slidingly secured on said rod, a spring interposed between the base of the stirrup and toggle, and means for actuating said secondary lever, whereby the gripper-shaft and sleeve are raised simultaneously and with different speed, substantially as and for the purposes specified.

14. In a lasting-machine, the combination, with the gripper-carrier and its gripper-shaft, of a sleeve loosely mounted on said shaft, levers engaging said shaft and sleeve, a toggle-joint connection between said levers, a pivoted stirrup, a spring interposed between said stirrup and toggle-joint, and means on one of the levers for controlling the movement of the toggle through the medium of the spring, substantially as and for the purposes specified.

15. In a lasting-machine, the combination, with the laterally-movable head-stock, of a gripper-carrier mounted thereon, a rotatable vertically-reciprocating gripper-shaft mounted in said carrier, jaws on the lower end of said shaft, a sleeve surrounding the upper portion of the jaws and loosely mounted on the shaft, and a toggle-joint connection between said shaft and sleeve, substantially as and for the purposes described.

16. In a lasting-machine, the combination, with the frame, of guideways thereon, a laterally-movable head-stock on said ways, a gripper-carrier pivotally mounted on said head-stock, a gripper-shaft mounted in said carrier, a sleeve on said shaft adapted to encircle the gripping-jaws, a toggle-joint connection between said shaft and sleeve, and means for rotating the shaft, substantially as and for the purposes described.

17. In a lasting-machine, the combination, with the guideways and laterally-movable head-stock thereon, of a gripper-carrier on the head-stock, gripper-jaws secured to a shaft mounted in the gripper-carrier, a retaining-finger, and a folding-arm adapted to lay the fold for the reception of a tack, substantially as and for the purposes described.

18. In a lasting-machine, the combination, with the guideways and laterally-movable head-stock, of a gripper-carrier, a gripper-shaft mounted therein, means for actuating said parts, a folder-arm adapted to lay the fold, said arm being provided with prongs and spring-lips to retain the fold in its position, a tack-delivering bar arranged to be projected above the folder-arm, means for automatically feeding the tacks to said bar, and a plunger for driving the tacks home, substantially as and for the purposes described.

19. In a lasting-machine, the combination, with the guideways and laterally-movable stock secured thereon, of a gripper-carrier on said head-stock, jaws mounted in said gripper-carrier, a folder-arm consisting of two spring-prongs provided with lips arranged to receive the leather and lay the fold, a divided tack-delivering bar composed of spring members, tack-feeding mechanism, a plunger, a tack-pit provided with brushes arranged to brush the tacks into the raceway, and suitable mechanism for actuating said parts correlatively, substantially as and for the purposes specified.

In testimony whereof I affix my signature, in presence of two witnesses, this 9th day of April, 1891.

JOHN T. AVERY.

Witnesses:
J. W. CROOKES,
A. RANIEL.